United States Patent
Chang

[19]

[11] Patent Number: 6,007,156

[45] Date of Patent: Dec. 28, 1999

[54] VERTICAL REST HELPING METHOD AND APPARATUS

[76] Inventor: Gene Hsin Chang, 4724 Wickford West, Sylvania, Ohio 43560

[21] Appl. No.: 08/715,604

[22] Filed: Sep. 18, 1996

[51] Int. Cl.⁶ .................................................. B60R 22/14
[52] U.S. Cl. ........................................... 297/465; 297/485
[58] Field of Search .................................... 297/464, 465, 297/485, 452.41

[56] References Cited

U.S. PATENT DOCUMENTS

| | | |
|---|---|---|
| 284,024 | 8/1883 | Kelly . |
| 1,722,205 | 7/1929 | Freund . |
| 2,255,464 | 9/1941 | Hall, Jr. . |
| 2,667,913 | 2/1954 | Dustin . |
| 2,667,917 | 2/1954 | Dustin . |
| 2,851,033 | 9/1958 | Posey . |
| 3,004,794 | 10/1961 | Yerkovich . |
| 3,063,752 | 11/1962 | Moore . |
| 3,099,486 | 7/1963 | Scott ............................ 297/485 X |
| 3,191,599 | 6/1965 | Kendell . |
| 3,524,679 | 8/1970 | De Lauvenne ...................... 297/465 |
| 3,531,158 | 9/1970 | Allen . |
| 3,570,011 | 3/1971 | Naig . |
| 3,612,605 | 10/1971 | Posey, Jr. . |
| 3,827,716 | 8/1974 | Vaugh et al. .................... 297/465 X |
| 4,063,778 | 12/1977 | Chika .............................. 297/465 |
| 4,189,181 | 2/1980 | Noble et al. . |
| 4,391,466 | 7/1983 | Smith . |
| 4,565,408 | 1/1986 | Palley . |
| 4,565,409 | 1/1986 | Hollonbeck et al. . |
| 4,788,969 | 12/1988 | Thompson . |
| 4,834,457 | 5/1989 | Head . |
| 4,838,613 | 6/1989 | Smith . |
| 4,979,779 | 12/1990 | Williams ............................. 297/465 |
| 4,996,978 | 3/1991 | Gingras . |
| 5,445,411 | 8/1995 | Kamiyama et al. . |
| 5,465,999 | 11/1995 | Tanaka et al. . |

FOREIGN PATENT DOCUMENTS

| | | | |
|---|---|---|---|
| 166141 | 7/1987 | Japan ..................... | 297/465 |

*Primary Examiner*—Peter R. Brown

[57] ABSTRACT

A method or an apparatus for helping a user rest and sleep while in a vertical sitting position on a seat by providing vertical and horizontal support to the user's upper body and head. The method comprises steps of providing and fitting one or more braces adaptable to the user's armpits, portion of his upper body and head; providing supporting frame and fastening means for the braces; adjusting the position of the braces to correspond to his height and size; and holding the braces continuously against the user's upper body and head, to provide continuous upward and horizontal support to the user against gravity. The apparatus comprises one or more braces with flexible structure adapted to the user's armpits, portion of his upper body and his head, and a supporting frame being integral with the seat with fasten means adjustable to the user's height and size. The braces, supporting frame and fasten means in combination continuously support the seated user's upper body and head vertically and horizontally, to help him sleep in the vertical sitting position.

4 Claims, 7 Drawing Sheets

VERTICAL REST HELPING METHOD AND APPARATUS

BACKGROUND OF THE INVENTION

The present invention relates to a vertical rest helping apparatus and the method implied in using the apparatus. The apparatus helps a user rest comfortably as his trunk is in a vertical sitting position. The apparatus is particularly useful for air and other long distance travels, and for people who have to work on chairs for a long time but physically cannot sit for long.

Currently in airplanes and trains, because of space limitation, the back of chairs cannot lie down. So passengers have to sit vertically for a long time, or even sleep in the vertical sitting position. In the vertical sitting position, waists, backbones and necks can easily get tired because they have to support the whole weights of upper bodies and heads. During sleep, lack of support, the positions of bodies are unstable, resulting in muscle pain, strain and paralyzation.

Our purpose of this present invention is to provide passengers with a device and method so they can sit or sleep comfortably in a vertical sitting position.

SUMMARY OF THE INVENTION

The present invention includes a bracket which commonly has a vest shape. On the top of the vest there is an integrated collar. The vest is internally filled with air or other soft and springy material. The vest can be adjusted to wrap the upper body and the neck evenly and comfortably. The vest is fastened or installed on a chair through belts, or other fastener means.

As the vest tightens a user's body and neck, the buoyancy generated by the internal air or other soft and springy material in the vest supports the head's and upper body's position and weight. The belts and buckles transfer much of the weight of the user's upper body and neck to the chair's frame so as to relieve the weight burden taken by the user's backbone, waist, and neck. The vest also stabilizes the position of the user's trunk and neck, so muscle strain and paralyzation become much less likely during sleep.

By applying the same method implied in the present invention, we can make a chair with a bracket (or brackets if it comprises several pieces) installed on a chair. The brackets are covered by soft and springy material so as to make contact comfortable and generate more buoyancy. The brackets fit under the user's armpits and head. The brackets can also have the portions (or pieces) fitting the user's waist, upper trunk and neck. The brackets can be adjusted so as to fit various body sizes. The brackets can be folded when they are not in use but unfolded when they are in use. A user can rest his armpits and head (or even most of his upper body) on the brackets, thus greatly relieving the weight burden on his spine and neck. This chair can also be used in houses and hospitals, to help patients who cannot sit for long because of weak backbones or muscles but need to do so for some other reasons (e.g., working on computers or reading, etc.).

BRIEF DESCRIPTION OF THE DRAWINGS

Some important features and advantages of the present invention can be described by the following embodiments with graphical illustration.

FIG. 3 shows only the ends of the belts not the vest itself.

BRIEF DESCRIPTION OF THE PREFERRED EMBODIMENT

Figure 1:
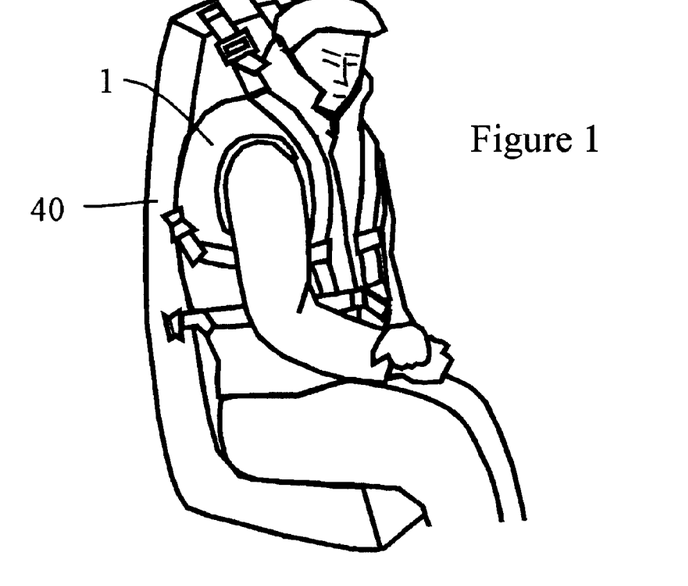
FIG. 1 is an illustration of a first embodiment of a vertical rest helping apparatus generally in accordance with the principles of the present invention.
Figure 2:
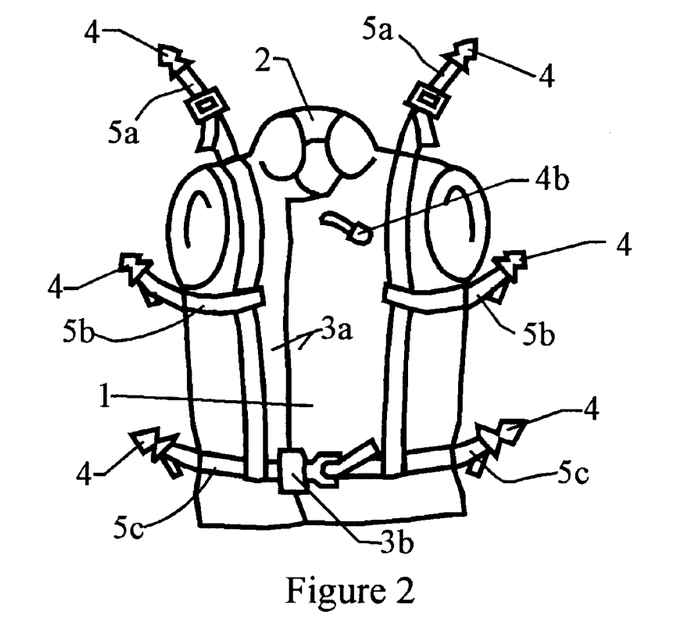
FIG. 2 is the front view of the vest (or vest shape bracket) in the first embodiment.
Figure 3:
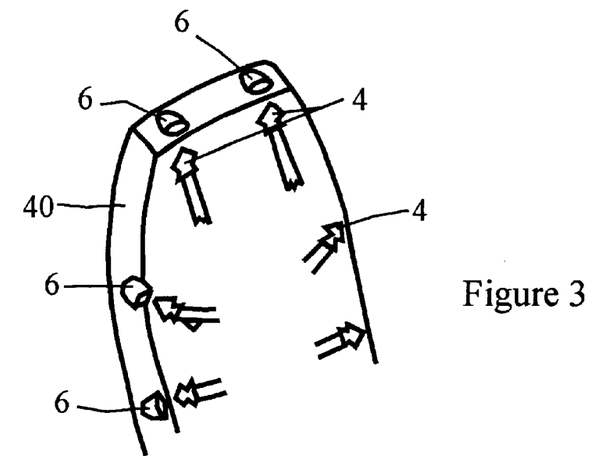
FIG. 3 is an illustration of a fastening device fastening the vest in the first embodiment onto a chair with buckle houses through means such as buckles and belts.

FIGS. 1, 2 and 3 show the first embodiment of a vertical rest helping apparatus generally in accordance with the principles of the present invention. The apparatus includes a vest or a vest shape bracket 1. The vest 1 is internally filled up with air and/or soft and springy material. The vest 1 has fastener means, such as VELCRO 3a and common buckles 3b to tighten the vest 1 on a user's body. The vest has a high collar portion 2, which also fills up with air or soft-and-springy material. The vest 1 has belts with buckles 4 at the ends of belts, which can be buckled up to a chair by preinstalled buckle houses 6 on the chair. The chair generally has the back portion and a seat portion, as shown in FIG. 1, whereby a user sits on the seat portion of the chair and wears the vest 1 which is mounted on the back portion of the chair through belts and buckles. The vest 1 is disposed parallel to the back portion of the chair. The collar portion fits under his neck.

Through adjusting the length of the belts and VELCRO 3a, the vest can fit various sizes of users. As the vest 1 is buckled up and tightened to the chair, the user's upper body, armpits, and neck are supported by the buoyancy of the air or soft and springy material in the vest. Because the belts 5a, 5b and 5c pull the vest 1 up, much of the weight of user's body and neck is transferred directly to the chair frame 40, thus relieving the weight burden from the user's spine and neck. In addition, the positions of body and head are stabilized by the belts and the vest 1 so much of the muscle paralyzation and strain during sleep can be avoided. Hence users feel more comfortable in the vertical sitting position.

The air can be filled into the vest 1 through an air valve 4b by the user's mouth or by a small air pump.

Figure 4:
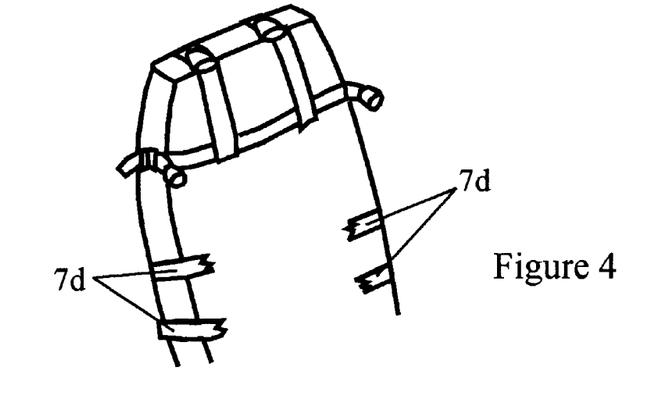
FIG. 4 is an illustration of a second embodiment of the vertical rest helping apparatus. It uses another fastening device to fasten the vest to a chair as the chair has a high back portion but has no pre-installed buckle houses on the chair.
Figure 5:
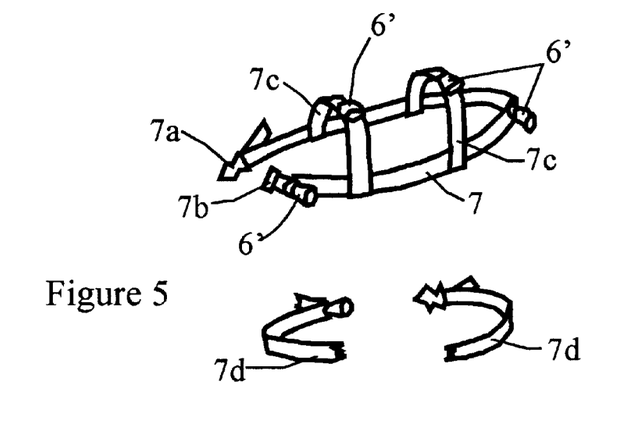
FIG. 5 is an exploded view of the fastening device in FIG. 4.

In the first embodiment as shown in FIG. 3, buckle houses 6 are preinstalled on the chair. In the second embodiment as shown in FIGS. 4 and 5, buckle houses 6' are not preinstalled on the chair. Instead, it uses a fastener accessory (as illustrated at the top of FIG. 5) to fix buckle houses 6' on the chair. This fastener accessory has at least one adjustable belt 7 which can be horizontally tightened on the back of a chair by buckles 7a and 7b at the two ends of the belt. It has another two belts 7c which can be hung on the top of the chair back. Buckle houses 6' are attached on the fastener accessory. Once this accessory is mounted on the chair, the user can use the attached buckle houses to fix the vest in a similar way as disclosed in the first embodiment. Two belts 7d are directly bound on the chair back (around the user's chest and waist) to stabilize the position of the vest, playing the similar role of the two belts 5b and 5c in the first embodiment.

Figure 6:
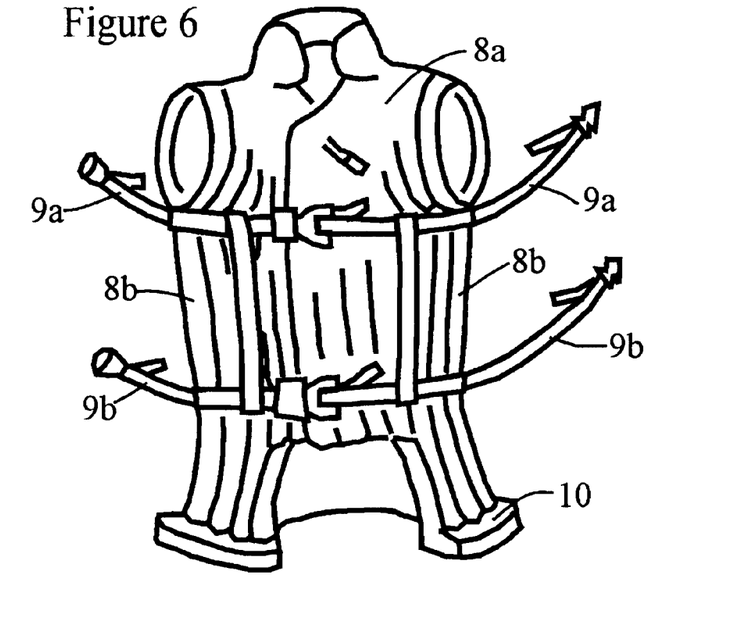
FIG. 6 is a front view of the bracket (or vest) in a third embodiment of the vertical rest helping apparatus.
Figure 7:
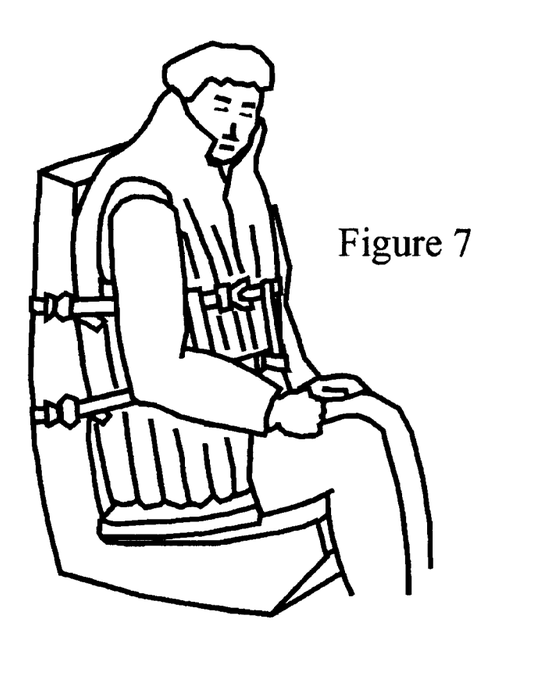
FIG. 7 is an illustration of the third embodiment.

In both the first and second embodiments, the chair has a high chair back. If the chair back is too low, the chair frame 40 is not generally able to hang the vest 1. A third embodiment of the vertical rest helping apparatus applies to a chair with lower back portion, as shown in FIGS. 6 and 7. The bracket 8a in the third embodiment looks more like a jacket than a vest. The bracket 8a includes a supporting structure disposed around bracket 8a. The supporting structure has a plurality of pillars 8b around the jacket and a base 10 for supporting the pillars 8b as shown in FIG. 6. The pillars 8b are thick air bags (or airtight rubber tubes), which will erect and become quite strong after being inflated. The pillars 8b and the base 10 then support the bracket 8a, in turn support the weight of user's body and head. Belts 9a and 9b are used to stabilize the position of the body.

Figure 8:
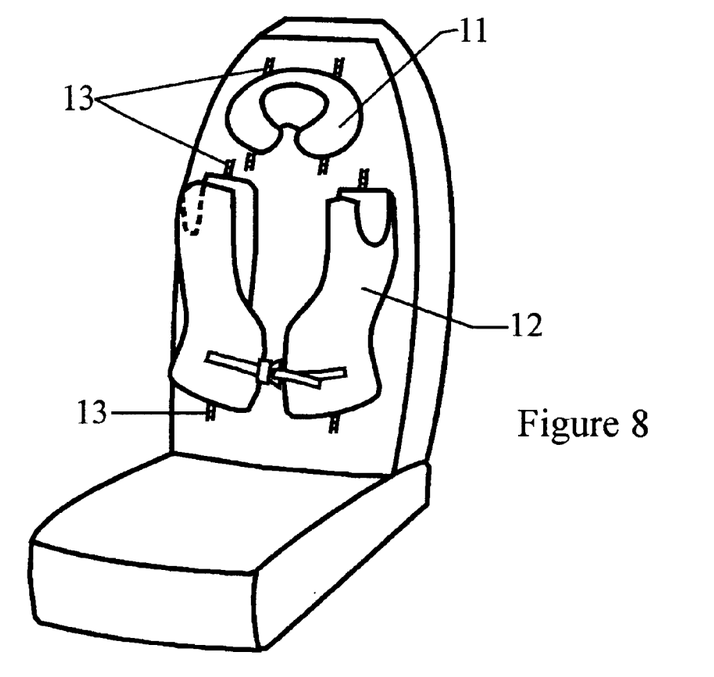
FIG. 8 is an illustration of a fourth embodiment and a general illustration of a fifth embodiment of the vertical rest helping apparatus, which shows a special chair with brackets which performs the said function.

In the fourth embodiment as shown in FIG. 8, a chair is particularly designed for performing the vertical rest helping function. The brackets 11 and 12 are used to replace the vest or jacket as disclosed in the first, second and third embodiments. The brackets 11 and 12 are all air bags or bags filled with soft and springy materials. When they are not in use, they can be deflated and detached/folded and hidden behind the cover of the chair or underneath the chair. When they are in use, the bags are inflated and form the structures as illustrated in FIG. 8. The bags are strong enough to be the brackets performing the vertical rest helping function. In FIG. 8, the bracket 11 is a pillow or collar which supports the head of a user. The brackets 12 support the user's armpits, breast and waist. The brackets are attached to the chair through hidden tracks 13 or other suitable means. The positions of the brackets are adjustable along the tracks to fit various heights and sizes of users.

The fifth embodiment of the vertical rest helping apparatus is a revised version of the fourth embodiment. The special feature is that the three brackets in the fourth embodiment are integrated into one piece in the fifth embodiment, so it looks like the vest in the first embodiment. Since other descriptions are very similar, a graphical illustration is omitted for the fifth embodiment.

Figure 9:
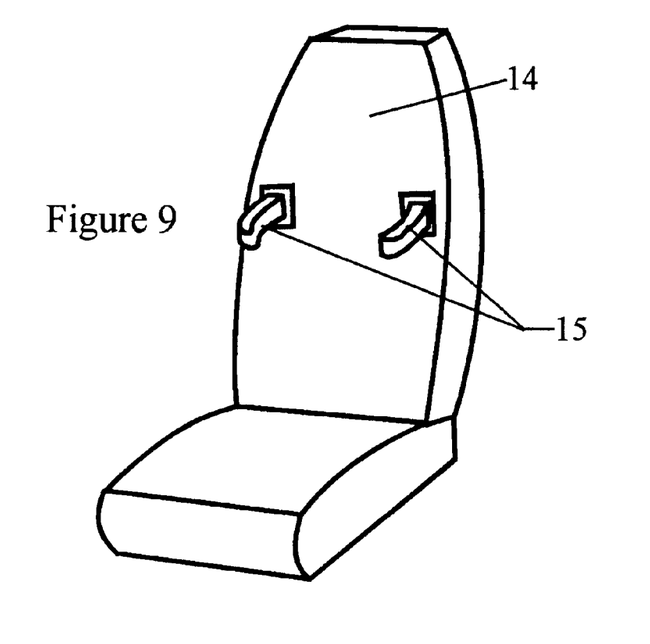
FIG. 9 is an illustration of a sixth embodiment of the vertical rest helping apparatus. It is a simplified version of the fourth embodiment. The brackets, like the top of crutches, just fit under the armpits.

The sixth embodiment of the vertical rest helping apparatus, as shown in FIG. 9, is a simplified version of the fourth embodiment. There are only two brackets 15 covered with soft material, which can fit under a user's armpits. The brackets 15 are fastened on the back of a chair 14. Their positions can be adjusted by hidden tracks and/or hinges, or other suitable means to fit various sizes of users. The brackets 15 are made springy (which can be done by putting springs at the bases of brackets or using other suitable means) so as to make the brackets more flexible and comfortable. As a user rests his armpits on the brackets 14, the brackets relieve the weight burden on his spine, and help to stabilize his upper body's position. Although the sixth embodiment has less buoyancy to support a user's body as compared with the first embodiment, these brackets are easier to install on and hidden behind a chair. So the sixth embodiment also has much practical application.

The fourth, fifth and sixth embodiments show how to make a special chair with the vertical rest helping function. This type of chair can replace the current chairs in airplanes and trains. The bracket(s) can be put underneath the chair or hidden behind the chair when it is not in use. A passenger can attach them on the chair or pull them out when he needs it.

It is appreciated that the principles of the present vertical rest helping method can be applied not only to chairs or seats in airplanes, trains, and buses, but also to comfort chairs for home, office, leisure and hospital uses. The seventh embodiment of the vertical rest helping apparatus demonstrates one example utilizing more buoyancy to make vertical sitting more comfortable, fun and enjoyable, which is termed "the water chair concept".

Figure 10:
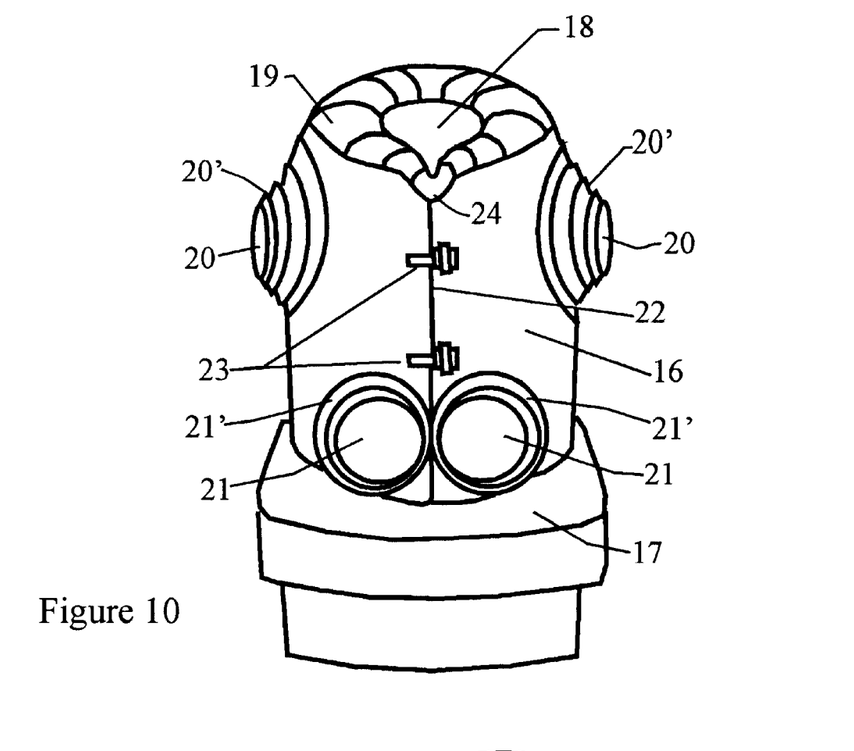
FIG. 10 is an illustration of the seventh embodiment of the vertical rest helping apparatus, the "water chair" concept.

FIG. 10 illustrates the device of the "water chair". The outside of the brackets now looks like a drum type container 16. It is disposed on a seat 17. The container 16 holds a watertight bag (bladder) 19 inside. The bag 19 is made of rubber or other very flexible material. The bag 19 may be separated into several pieces (which may be referred to as bags). The bag (bladder) 19, roughly speaking, looks like a life buoy ring being stretched vertically to a tube cylinder. Water or other liquid can be filled in the said "life buoy ring" 19. The internal circle of the said "life buoy ring" forms a cylinder-like hole 18. More precisely, the surface of the said hole 18 is shaped to accommodate and fit a human's trunk. There are another two holes 20 on the container and the bag structure for the user's arms to stretch out, and another two holes 21 for the user's legs to stretch out. Attached to the holes 20 and 21 there are ring shape flexible structures 20' and 21', allowing the joints of arms and legs to move more freely but at the same time holding the water bags inside the container. A user can get in the container from the top of the container before water fills into the bag. Alternatively, the container can be opened from front 22 to allow a user to get in. The said container can be closed and locked by buckles 23. The container also has a gap 24 on its top to let the user's chin rest more comfortably.

Figure 11:
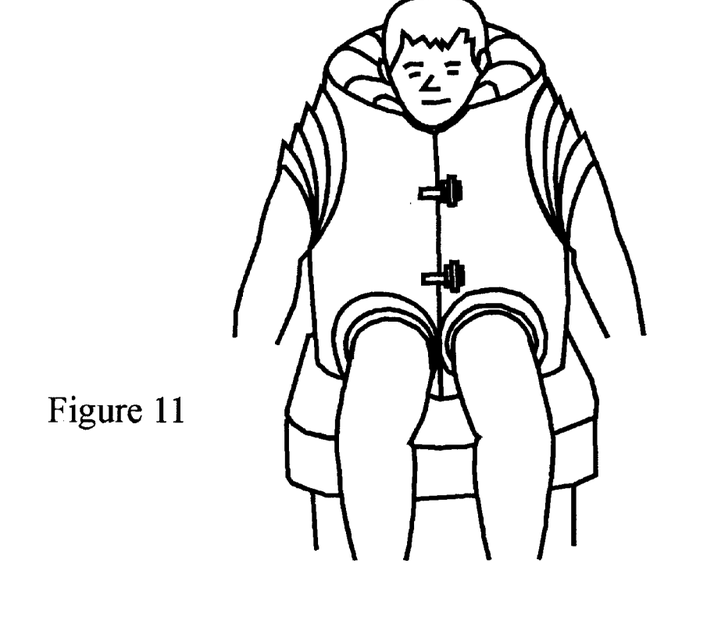
FIG. 11 is an illustration of a use of the "water chair".

After a user puts his trunk inside the container 18, and stretches his limbs out of the holes 20 and 21, the container is closed and water is filled into the bags. The bags evenly contact the user's body and generate much buoyancy. The user feels like his upper body is floating in water, and the weight burden on his spine is minimized. Yet because of the structure of the said bags and container, his upper body's position is still kept vertical. He can enjoy fun in the water but does not have to get wet. FIG. 11 illustrates a use of the "water chair."

Variations can be made from the said "water chair" model. More space can be made within the container and the structure of the said bags can be redesigned to fit and allow limbs to rest inside. Water (or liquid) within the said bags (bladders) can be warmed or whirled by proper means, to perform additional massage functions or generate more buoyancy. Such a device of "the water chair" has much potential for leisure and medical uses.

Figure 12:
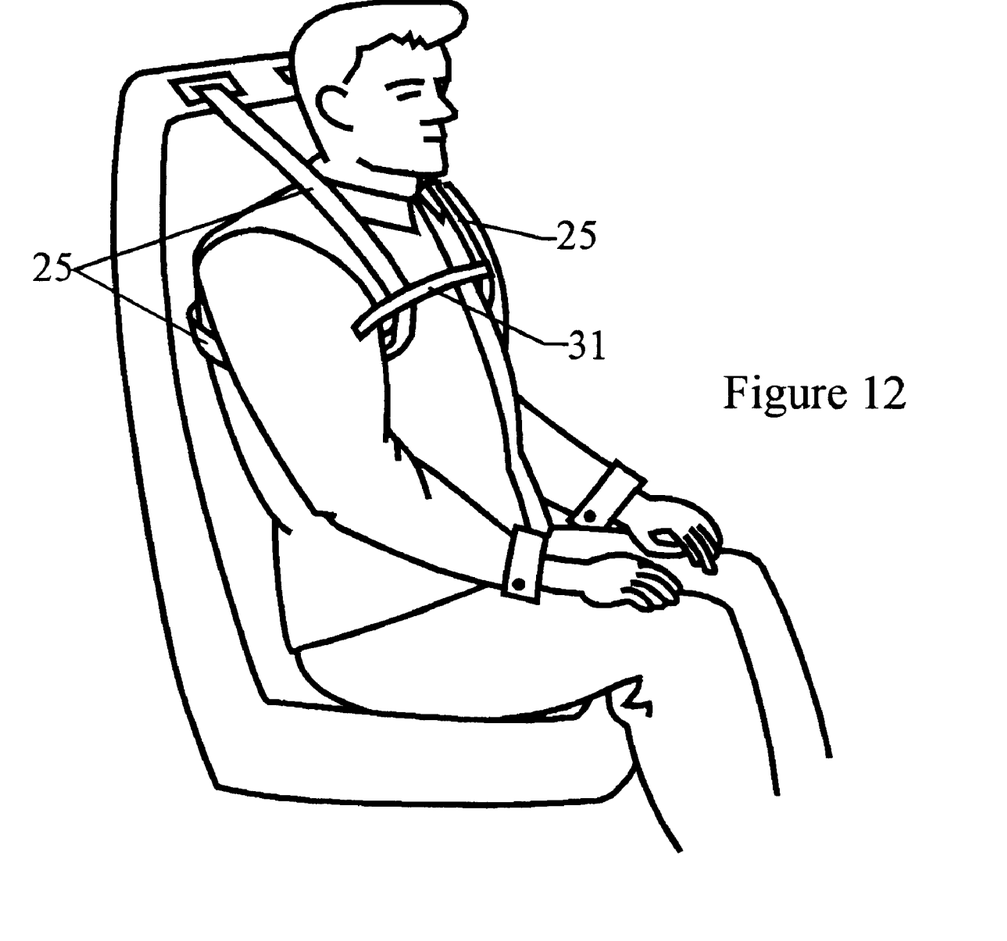
FIG. 12 is an illustration of an eighth embodiment.

Variations can be made, especially in matters of shape and arrangement of the brackets and fastening means, within the principles of the vertical rest helping method. The eighth embodiment of a vertical rest helping apparatus is another variation of the shape of the brackets. In the eighth embodiment, the brackets as termed in the present invention are actually belts which perform the same supporting function. The eighth embodiment is illustrated in FIG. 12. The belts 25 go under a user's armpits. The belts 25 are fastened on a chair back and pull up the user's upper body from his armpits, so as to relieve the weight burden on the user's spine and to stabilize the upper body's position. A supplementary belt 31, which fastens the two belts 25, helps to control the horizontal distance of the belts 25.

Figure 13:
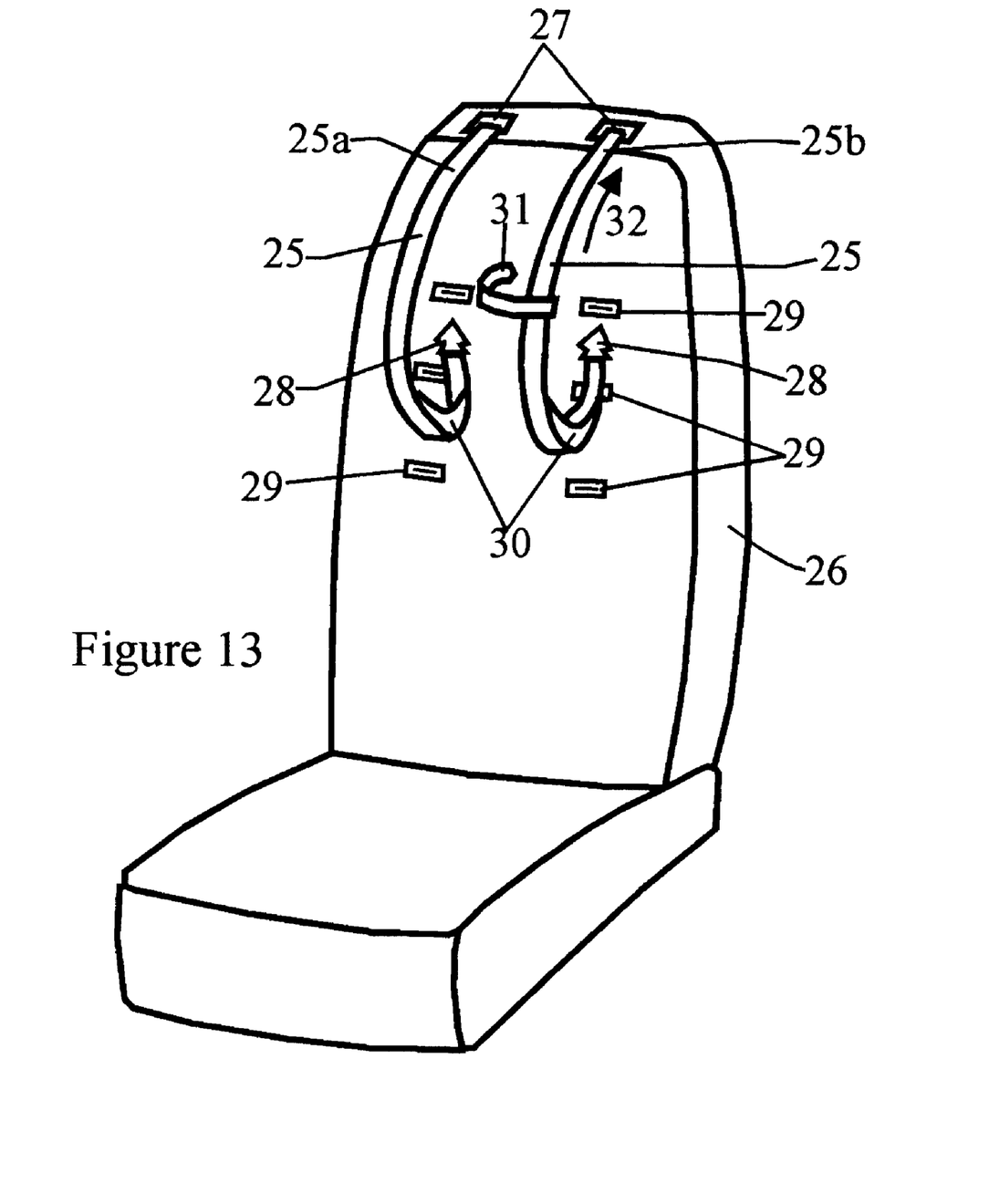
FIG. 13 is a front view of a chair with vertical rest helping belts in the eighth embodiment.

FIG. 13 shows a more detailed view of the apparatus in the eighth embodiment. The belts 25 can be either hidden in a chair back 26 or pulled out from mouths 27 on the top of the chair back. At one end of belts 25 there are buckles 28 which can be buckled up to buckle houses 29. The buckle houses 29 have various positions on the chair back, in order to fit various sizes of users. There are spiral power springs or other mechanisms inside the seat back 26, which pull up the belts 25 and generate buoyancy of the belts. The technology of using a spiral power spring mechanism to pull a belt is publically known so a graphical illustration is omitted. The direction of the springy pulling force is shown by an arrow 32. The power of the springy pulling force may be adjustable. An approach to adjust the pulling force is using a handle or a motor to wind the spiral power springs. Cushions 30 can be added at the sections of the belts where armpits contact, so as to make the belts fit the curve of armpits better and to have more buoyancy. A supplementary belt 31 is disposed horizontally to connect the two belts 25a and 25b, which helps the two belts 25a and 25b to wrap the upper body more comfortably. One side of the belt 31 can be detached or attached to the belt 25a by VELCRO fasteners at the user's discretion. VELCRO fasteners are located at various positions of the belt 31 so the length of the connection portion of the belt 31 is adjustable. The other side of the supplementary belt 31 is rotatably fastened on belt 25b by a rivet, so that the supplementary belt 31 can be pulled into and be hidden in the chair back together with the belt 25b when the said belts are not in use.

It can be seen that actually the apparatus in the eighth embodiment is just a much simplified version of the first embodiment. Since this device is easy to manufacture and to adapt to a small and neat space, it is very practically applicable in airplanes, automobiles, etc.

Additions to the device in the eighth embodiment can be made in order to support the upper body through larger areas of contact. For instance, a waist belt can be added, and the said waist belt can be fastened to the seat frame, in a similar way as the belt 5c in FIG. 2, to support the waist. A collar attaching to the chair back can be added, as the collar 11 in FIG. 8, to support the head. By combining various parts as illustrated in various embodiments, a device better fits a particular need can be made.

An additional beneficial effect of the apparatus in the eighth embodiment is improving travel safety, especially for those sleeping airplane passengers in turbulence. To further enhance the said effect, additional mechanism can be added to the belts 25 so that the belts 25 would be locked from the seat frame in collision. This can easily be done by using the existing technology to lock car seat belts in collision, or just using simple manual locks at the mouths 27.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement and combinations of parts within the principles of the present invention to the full extent indicated by the broad general meaning of the terms in which the appended claims are expressed.

I claim:

1. A method for helping a user rest and sleep while in a vertical sitting position on a seat, the method comprising the steps of:
   (a) providing and fitting at least one brace adaptable to the user's armpits and at least a portion of sides of the user's upper body, the at least one brace forming contact areas at the armpits and the portion of the user's upper body;
   (b) holding the at least one brace against the user's upper body at the contact areas;
   (c) providing a supporting frame which is integral with and substantially vertical to the seat to support the at least one brace;
   (d) providing fastening means to fasten the at least one brace and the supporting frame;
   (e) adjusting upwardly the at least one brace to a height position so that the at least one brace supports the user's upper body from underneath the user's armpits;
   (f) adjusting the fastening means to correspond to the height position of the at least one brace;
   (g) fastening the at least one brace to the supporting frame;
   (h) holding the at least one brace in the height position and continuously engaging the at least one brace with the upper body at the contact areas, thereby providing continuous upward support to the user's upper body against gravity at the contact areas, to relieve a weight burden on the user's spine; and
   (i) holding the at least one brace stably from plural horizontally spaced positions at the supporting frame thereby providing a continuous horizontal support to stabilize the user's upper body, to relieve stressed muscles for stabilizing the user's upper body.

2. A vertical rest helping method according to claim 1, further comprising steps of:
   (a) providing a collar portion integral with the at least one brace,
   (b) fitting and adapting the collar portion to the user's neck, and
   (c) positioning the collar portion under the user's head and around the user's neck, the collar portion continuously supporting the head from underneath and a portion of sides of the head,
   whereby the collar portion supports the user's head's weight and stabilizes the user's head to relax the user's neck muscles and to reduce a risk of neck sprain especially while sleeping.

3. An apparatus for helping a user rest and sleep while in a vertical sitting position on a seat, comprising:
   at least one brace having a flexible structure adapted to support the user's armpits and at least a portion of sides of the user's upper body, the at least one brace adapted to form contact areas at the armpits and the portion of the user's upper body;
   a supporting frame being integral with and substantially vertical to the seat;
   fastening means for fastening the at least one brace to the supporting frame to transfer a weight of the user's upper body to the supporting frame, the at least one brace, fastening means, and the supporting frame in combination being adjustable to correspond to a height of the user's body, the at least one brace fastened to the supporting frame at a substantially high position so that the at least one brace may be positioned against the user's armpits from underneath and continuously engaged with the contact area, thereby providing continuously upward support to the user's upper body from the armpits and the contact areas, and the at least one brace fastened to the supporting frame at plural horizontally spaced positions thereby providing continuous horizontal support to the user's upper body to stabilize the user's body, which relieves stressed muscles for stabilizing the user's body.

4. A vertical rest helping apparatus according to claim 3, further comprising a collar portion integral with the at least one brace, the collar portion adaptable to the user's neck and positioned under the user's head and around the user's neck, the position of the collar portion being substantially high to provide continuously upward support to the head from underneath, the position of the collar portion being substantially stable to provide continuous support for stabilizing the head.

* * * * *